United States Patent [19]

Suzuki et al.

[11] Patent Number: 4,891,705
[45] Date of Patent: Jan. 2, 1990

[54] APPARATUS FOR GENERATING A PICTURE SIGNAL AT PRECISE HORIZONTAL POSITION

[75] Inventors: Hiroyuki Suzuki; Kazuhide Kawata, both of Tokyo, Japan

[73] Assignee: NEC Corporation, Tokyo, Japan

[21] Appl. No.: 277,816

[22] Filed: Nov. 30, 1988

[30] Foreign Application Priority Data

Nov. 30, 1987 [JP] Japan .................................. 302185

[51] Int. Cl.⁴ ..................... H04N 5/04; H04N 5/272; G09G 1/06
[52] U.S. Cl. ..................................... 358/148; 358/22; 358/183; 340/724
[58] Field of Search ............... 358/22, 148, 149, 160, 358/183, 153; 340/724

[56] References Cited

U.S. PATENT DOCUMENTS

| | | | |
|---|---|---|---|
| 4,228,433 | 10/1980 | Matsumoto | 358/148 |
| 4,409,618 | 10/1983 | Inaba et al. | 358/183 |
| 4,420,770 | 12/1983 | Rahman | 358/183 |
| 4,722,004 | 1/1988 | Miyamoto et al. | 358/153 |
| 4,736,162 | 4/1988 | Ishihara | 358/148 |

Primary Examiner—John W. Shepperd
Assistant Examiner—Michael D. Parker
Attorney, Agent, or Firm—Sughrue, Mion, Zinn, Macpeak & Seas

[57] ABSTRACT

An apparatus for use in for a system indicating at least first and second pictures in a screen of a horizontal scan type display, includes a first circuit for measuring the pulse width or duration of a horizontal synchronism signal for the first picture, and a second circuit for determining a horizontal indication start position of the second picture on the basis of the measured pulse width or duration of a horizontal synchronism signal.

4 Claims, 8 Drawing Sheets

APPARATUS FOR GENERATING A PICTURE SIGNAL AT PRECISE HORIZONTAL POSITION

BACKGROUND OF THE INVENTION

1. Field of the Invention

The present invention relates to a picture signal generator, and more specifically to an apparatus for generating a picture signal for producing a different picture to be superimposed with a broadcast image in a screen of a scan type display such as a cathode ray tube. More particularly, the present invention relates to a circuit for precisely defining a horizontal indication start position of the above mentioned different picture.

2. Description of Related Art

In the prior art, in the case of indicating a different picture to be superimposed with a broadcast image in a screen of a scan type display such as a cathode ray tube, a horizontal indication start position signal for the different picture has been generated by counting, from a trail edge of a horizontal synchronism signal, the number of pulses which are generated in synchronism with the horizontal synchronism signal but at a repetition frequency sufficiently higher than that of the horizontal synchronism signal. However, this method has been disadvantageous in that when the pulse width or duration of the horizontal synchronism signal varies, the timing of generation of the horizontal indication start position signal also varies, with the result that the different picture will shift in the horizontal direction.

In the prior art, therefore, an generator of the horizontal indication start position signal had to be adjusted while viewing the position of the superimposed different picture in the screen of the horizontal scan type display.

SUMMARY OF THE INVENTION

Accordingly, it is an object of the present invention to provide a picture signal generator which has overcome the above mentioned defect of the conventional one.

Another object of the present invention is to provide an apparatus for generating a horizontal indication start position signal for a different picture to be superimposed with a broadcast image in a screen of a horizontal scan type display, without being influenced by variation of the pulse width or duration of the horizontal synchronism signal.

The above and other objects of the present invention are achieved in accordance with the present invention by an apparatus for use in for a system indicating at least first and second pictures in a screen of a horizontal scan type display, the apparatus including a first circuit for measuring the pulse width or duration of a horizontal synchronism signal for the first picture, and a second circuit for determining a horizontal indication start position of the second picture on the basis of the measured pulse width or duration of a horizontal synchronism signal.

According to another aspect of the present invention, there is provided an apparatus for use in for a system indicating at least first and second pictures in a screen of a horizontal scan type display, comprising a horizontal position signal generator receiving a horizontal synchronism signal for generating a horizontal position pulse signal in synchronism with a trailing edge of the horizontal synchronism signal but at a repetition frequency sufficiently higher than that of the horizontal synchronism signal, a horizontal indication start position counter coupled to receive the horizontal position pulse signal, a horizontal synchronism signal width measuring counter coupled to receive and count a measurement clock when the horizontal synchronism signal is at a predetermined level, a horizontal indication start position controller coupled to receive an output of the horizontal synchronism signal width measuring counter and a horizontal synchronism signal reference width data for generate a horizontal indication start position data, a horizontal indication start position data latch coupled to receive and latch the horizontal indication start position data, and a coincidence detection circuit coupled to receive an output count of the horizontal indication start position counter and the output of the horizontal indication start position data latch for generating a horizontal indication start position signal when the count value of the indication start position counter becomes coincident with the value of the horizontal indication start position data.

According to a still further aspect of the present invention, there is provided an television receiver comprising a television signal processing circuit receiving and processing a television signal for displaying a television image, and a character signal generator for superimposing a character on the television image, the character signal generator including comprising a first circuit for measuring the pulse width of a horizontal synchronism pulse for the television image, and a second circuit for determining a horizontal indication start position of a character to be superimposed, on the basis of the measured pulse width of the horizontal synchronism pulse.

The above and other objects, features and advantages of the present invention will be apparent from the following description of preferred embodiments of the invention with reference to the accompanying drawings.

DESCRIPTION OF THE PREFERRED EMBODIMENTS

Figures 1, 2:
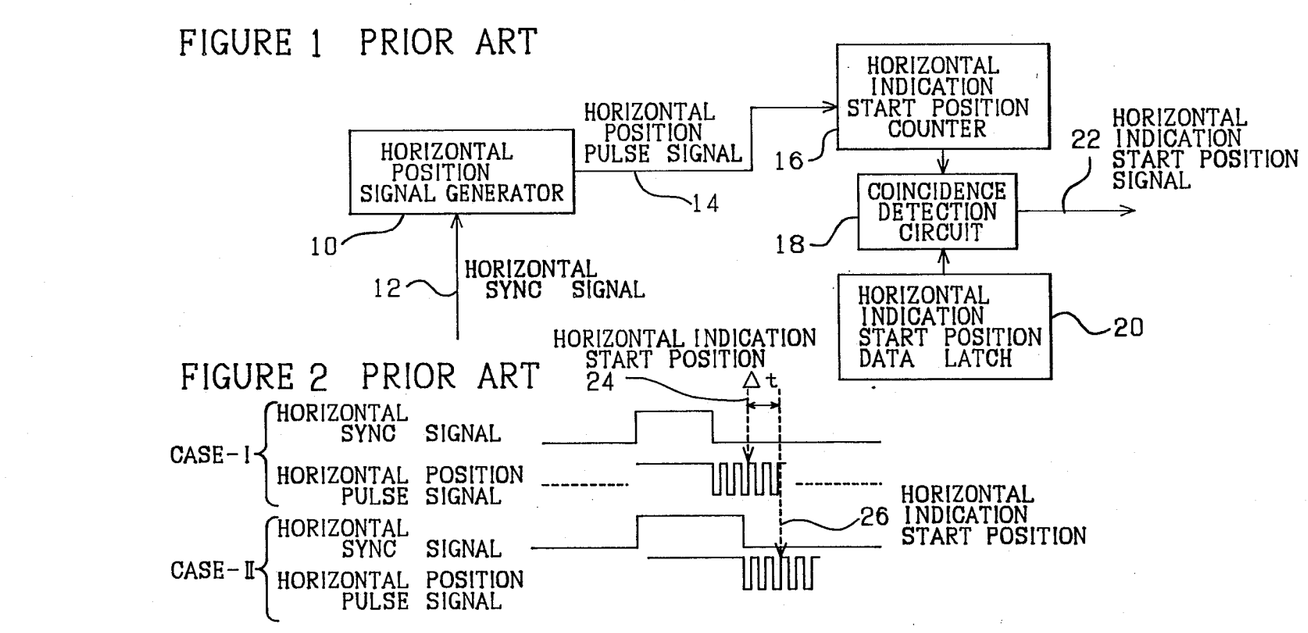
FIG. 1 is a block diagram of a conventional picture signal generator.
FIG. 2 is a waveform diagram illustrating a relation between a horizontal synchronism signal, a horizontal position signal and a horizontal indication start position signal, in the picture signal generator shown in FIG. 1.

Referring to FIG. 1, there is shown a block diagram of a conventional picture signal generator. The shown picture signal generator includes a horizontal position signal generator 10 receiving a horizontal synchronism signal 12 for generating a horizontal position pulse signal 14 in synchronism with a trailing edge of the horizontal synchronism signal 12 but at a repetition frequency sufficiently higher than that of the horizontal synchronism signal 12. The horizontal position pulse signal 14 is supplied to a horizontal indication start position counter 16, which is in turn coupled at its count output to one input of a coincidence detection circuit 18. This coincidence detection circuit 18 has another input coupled to receive a horizontal indication start position data from a horizontal indication start position data latch 20, and operates to generate a horizontal indication start position signal when the count value of the indication start position counter 16 becomes coincident with the value of the horizontal indication start position data.

As shown in FIG. 2, the horizontal position pulse signal 14 is generated after the trailing edge of the horizontal synchronism signal 12 and in synchronism with the trailing edge of the horizontal synchronism signal 12. On the other hand, the counter 16 is reset by the horizontal synchronism signal 12. Therefore, the horizontal indication start position signal 22 is generated by the coincidence detection circuit 18 when the horizontal position pulse signal 14 has been counted until the number indicated by the horizontal indication start position data after the trailing edge of the horizontal synchronism signal 12. However, if the pulse width or duration of the horizontal synchronism signal 12 itself varies as seen in cases I and II shown in FIG. 2, the timing of the generation of the horizontal indication start position signal 22 will varies, as indicated by Reference Numerals 24 and 26. Namely, the timings 24 and 26 of the generation of the horizontal indication start position signal 22 are deviated from each other by a time length Dt. This deviation Dt means a shift of the picture to be indicated.

Figure 3:
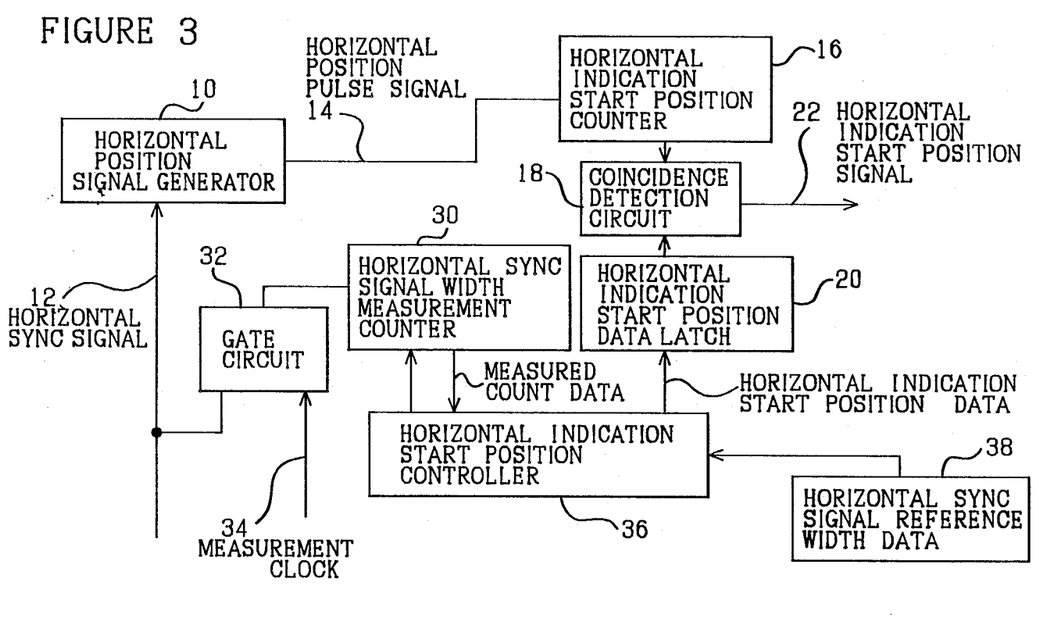
FIG. 3 is a block diagram of a first embodiment of the picture signal generator in accordance with the present invention.

Turning to FIG. 3, there is shown a block diagram of a first embodiment of the picture signal generator in accordance with the present invention. In FIG. 3, circuits similar to those shown in FIG. 1 are given the same Reference Numerals, and explanation thereof will be omitted for simplification of description.

As seen from comparison between FIGS. 1 and 3, the picture signal generator shown in FIG. 3 includes, in addition to the circuits shown in FIG. 1, a horizontal synchronism signal width measuring counter 30 coupled to a gate circuit 32 which receives a measurement clock 34 and is controlled by the horizontal synchronism signal 12. An output of the horizontal synchronism signal width measuring counter 30 is coupled to a horizontal indication start position controller 36, which is also coupled to receive a horizontal synchronism signal reference width data from a reference data latch 38. This controller 36 outputs a horizontal indication start position data to the the horizontal indication start position data latch 20, and a data receipt acknowledge signal to the horizontal synchronism signal width measuring counter 30.

Figure 4:
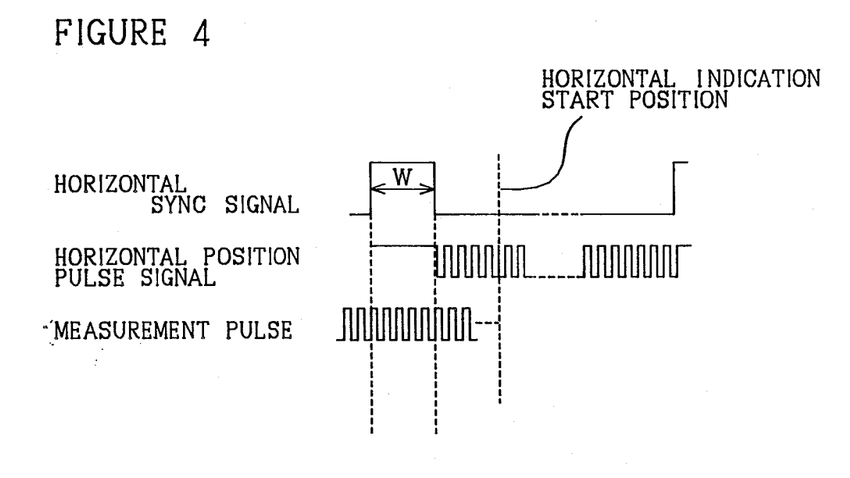
FIG. 4 is a waveform diagram illustrating a relation between a horizontal synchronism signal, a horizontal position signal and a horizontal indication start position signal, in the picture signal generator shown in FIG. 3.

Thus, the horizontal synchronism signal 12 is inputted to the horizontal position signal generator 10 and the gate circuit 32. Therefore, similarly to the apparatus shown in FIG. 1, the horizontal position signal generator 10 generates the horizontal position pulse signal 14 after the trailing edge of the horizontal synchronism signal 12 and in synchronism with the trailing edge of the horizontal synchronism signal 12, as shown in FIG. 4. On the other hand, during a time period in which the horizontal synchronism signal 12 is at a high level, the gate circuit 32 is opened to allow the measurement pulse 34 to be supplied to the horizontal synchronism signal width measuring counter 30. As a result, the counter 30 counts the measurement pulse 34 of the number indicative of the pulse width W of the horizontal synchronism signal 12. This count value of the counter 30 is supplied to the controller 36. When the controller 36 has completed the receipt of the count value, the controller 36 outputs the receipt acknowledge signal to the counter 30 so as to reset the counter 30. At the same time, the controller 36 compares the received count value with the horizontal synchronism signal reference width data from the reference data latch 38, and generates a modified or corrected horizontal indication start position data to the latch 20. For example, when the count value of the width counter 30 is larger than the horizontal synchronism signal reference width data, the controller 36 generates the horizontal indication start position data which has been reduced by a difference between the count value of the width counter 30 and the horizontal synchronism signal reference width data. On the other hand, when the count value of the width counter 30 is smaller than the horizontal synchronism signal reference width data, the controller 36 generates the horizontal indication start position data which has been increased by a difference between the count value of the width counter 30 and the horizontal synchronism signal reference width data.

Then, the horizontal indication start position counter 16 counts the horizontal indication pulse signal 14, and the coincidence detection circuit 18 generates the horizontal indication start position 22 when the value of the counter 16 has coincided with the modified or corrected horizontal indication start position data held in the latch 20. Accordingly, the horizontal indication start position 22 is generated when a time period defined by the horizontal indication start position data has been elapsed after a leading edge of the horizontal synchronism signal 12, without being influenced by the variation of the pulse width of the horizontal synchronism signal 12.

Figure 5:
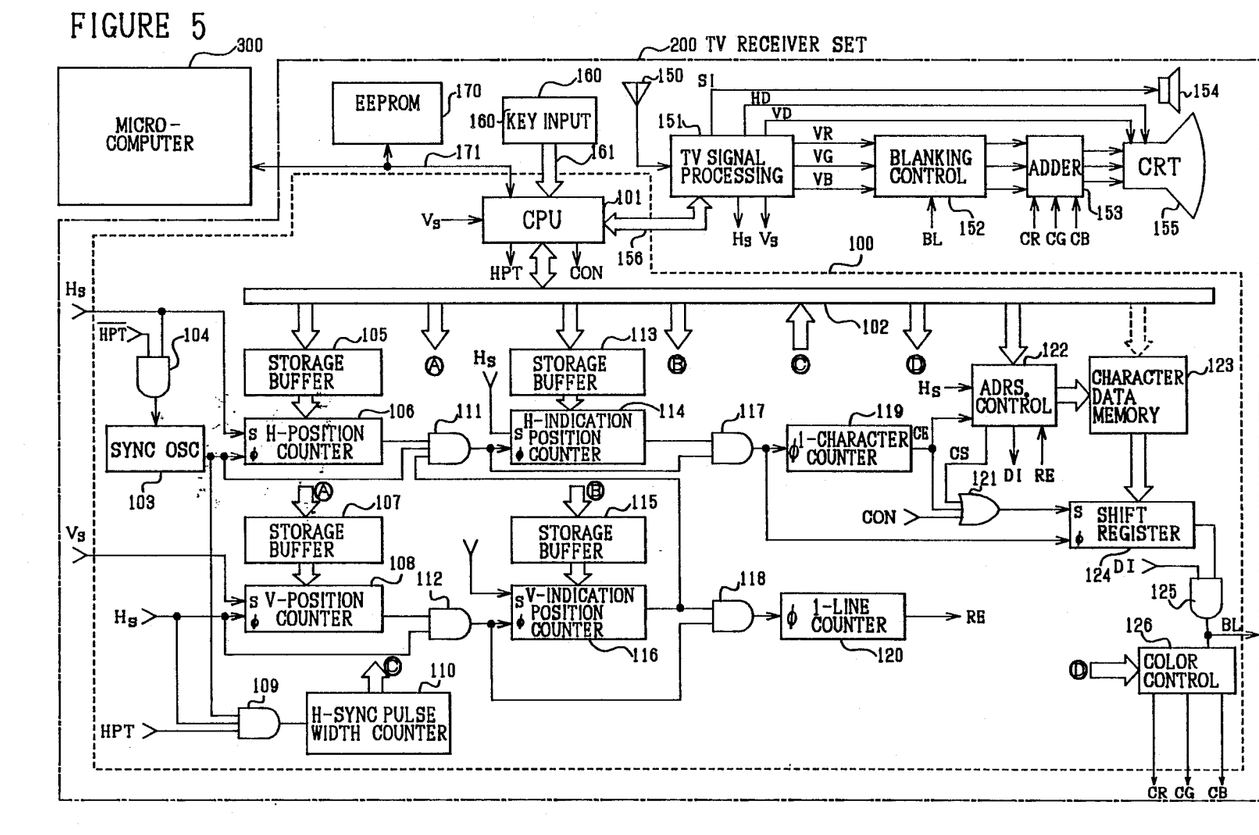
FIG. 5 is a block diagram of a first embodiment of a television receiver set incorporating therein the picture signal generator in accordance with the present invention.

Referring to FIG. 5, there is shown a block diagram of a television receiver set incorporating therein the picture signal generator in accordance with the present invention. The shown television receiver set is indicated generally by Reference Numeral 200 and includes various circuits and elements shown and connected in FIG. 5. Details of the respective circuits and elements will be explained in the following explanation of the operation of the television receiver set.

The shown television receiver set includes a picture or character signal generator 100 in accordance with the present invention for generating a character signal used to indicate a character or characters (including numerals, characters, signs, etc) in a manner superimposed with a television image. This character signal generator 100 includes a microcomputer or CPU (central processing unit) 101 capable of executing predetermined processings to a television signal processing circuit 151. For example, if a channel selection key in a key input 160 is depressed, the CPU discriminates a depressed key and outputs a channel selection data to the television signal processing circuit 151 through a bus 156. The television signal processing circuit 151 performs a tuning operation on the basis of the received channel selection data, so that the circuit 151 selects one received broadcasting wave supplied from an antenna 150. The received broadcasting wave is demodulated and color signals $V_R$, $V_G$ and $V_B$ for the broadcasting image are generated. These color signals $V_R$, $V_G$ and $V_B$ are supplied to a CRT (cathode ray tube) 155 through a blanking control circuit 152 and an addition circuit 153. The television signal processing circuit 151 supplies a horizontal deflection signal $H_D$ and a vertical deflection signal $V_D$ to the CRT 155. As a result, a television image is displayed on a screen of the CRT 155. Further, a sound signal SI is generated in the television signal processing circuit 151 and supplied to a loudspeaker 154. The key input 160 includes not only the selection key but also a sound volume key, a brightness adjustment key, a contrast adjustment key, etc. If one or more of these keys are depressed, the CPU 101 discriminate which of the keys is depressed, and supplies through the bus 156 various control data in accordance with the depressed key.

In the above mentioned television receiver set incorporating therein the microcomputer, the control operation of the microcomputer to the television signal processing circuit is well known to persons skilled in the art, and therefore, further explanation will be omitted.

The character signal generator 100 can cause a desired character or characters to be displayed at a desired position in the screen of the CRT 155 which displays the television image. For this purpose, the character signal generator 100 includes a synchronism oscillator 103 for inspecting where a scan line of the CRT is positioned in the screen. This oscillator 103 receives through an AND gate 104 a horizontal synchronism signal $H_S$ and oscillates in synchronism with the horizontal synchronism signal $H_S$, Namely, as explained hereinbefore with reference to FIG. 2, the oscillator 103 stops its oscillation during a period in which the horizontal synchronism signal $H_S$ is at a high level, and starts its oscillation after a predetermined period of time from the moment the horizontal synchronism signal $H_S$ falls down. The oscillator 103 is set to generate a train of pulses with a repetition period of the same time as a time length in which one pixel is indicated on the screen of the CRT 155. Therefore, by counting the pulses generated by the oscillator 103, it is possible to know a position in a horizontal direction on the screen of the CRT 155.

Figure 6:
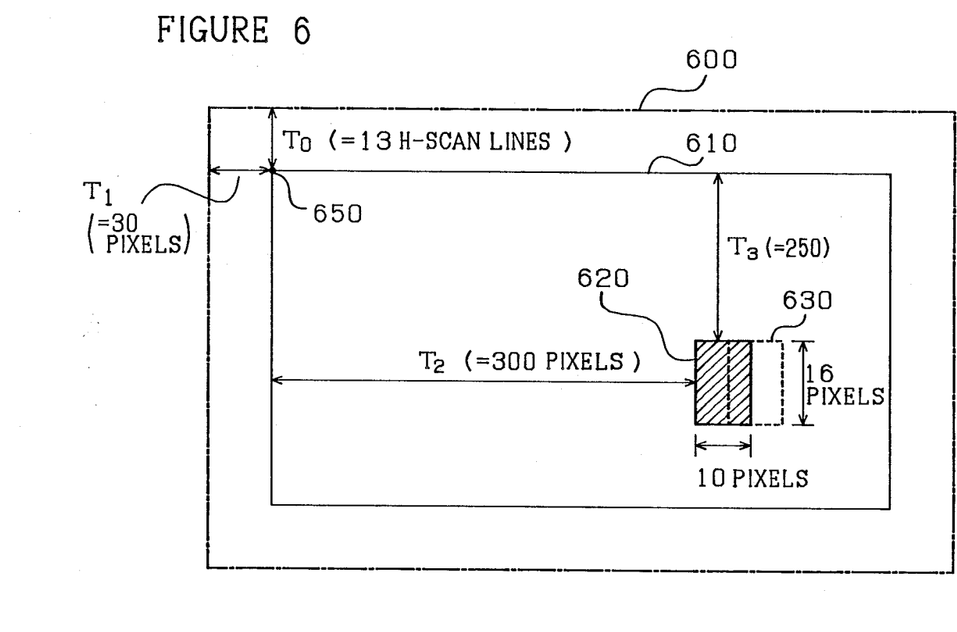
FIG. 6 illustrates a relation between an image indicated in CRT screen and a scanning line.

As well known, however, an image actually indicated in the screen of the CRT 155 is smaller in size than an image transmitted from a broadcasting station. In brief, as shown in FIG. 6, the broadcasting station transmits an image having a size indicated by line 600 in FIG. 6, but an image indicated by line 610 will be actually displayed on the screen of the CRT 155. A difference between the broadcasting image 600 and the actually displayed image 610, namely, an indication start position 650, is set both in a vertical direction and in a horizontal direction, by respective television set makers independently of each another. For example, as shown in FIG. 6, a time $T_0$ of the indication start point 650 in the vertical direction corresponds to thirteen scan lines (namely, thirteen pixels in the vertical direction). On the other hand, a time $T_1$ of the indication start point 650 in the horizontal direction corresponds to thirty pixels. Here, consider the case that a character 260 is to be displayed at a position separated from the indication start position 650 by a distance corresponding to 300 pixels in the horizontal direction. As mentioned hereinbefore, since the repetition period of the pulse generated by the synchronism oscillator 103 corresponds to one pixel, a signal for the character 620 is superimposed on the television image when 330 pulses from the oscillator 103 are counted. On the other hand, however, the width of the horizontal synchronism signal $H_S$ is determined by the characteristics of the television signal processing circuit 151, and therefore, is different dependent upon television receiver set makers, and further upon the types of the sets although made by the same maker. The pulse width of the horizontal synchronism pulse signal $H_S$ is 4.5 $\mu$sec in a standard case but is actually selected from a range of 4 to 6 $\mu$sec. On the other hand, the repetition period of the pulse generated by the oscillator 103, which corresponds to one pixel, is 250 nsec. Accordingly, in the television receiver set in which the horizontal synchronism pulse $H_S$ having a 6 $\mu$sec pulse width is generated, the synchronism oscillator 103 will generates the horizontal position counting pulse at a timing delayed by a time length of 6 pixels from the case in which the horizontal synchronism pulse $H_S$ having a standard 4.5 $\mu$sec pulse width is generated. Assuming that one character has a size of 10 pixels in a horizontal direction and 16 pixels in a vertical direction, the shift of the 6 pixels means that an indication position of the character is moved rightward from an intended position 620 by 60% of the size of the character, as shown in a dotted line 630 in FIG. 6. If only one character is to be displayed, the shift of the indication position may be acceptable. However, if a number of characters are to be displayed together in combination, the shift of the indication position may result in a partial or complete disappearance of a final character in some case. In addition, if the characters to be indicated in a enlarged size for example in a double size or in a triple size, the enlarged character may be partially disappeared.

In order to avoid the above mentioned inconvenience, each of television receiver set makers had to adjust the pulse width of the horizontal synchronism pulse to a desired width before shipment. The adjustment of the width of the horizontal synchronism pulse inevitably requires the horizontal deflection circuit, and therefore, needs a number of adjustment steps and complicated adjustment.

The character signal generator 100 shown in FIG. 5 makes the adjustment unnecessary, and also, make it easy to program for setting of the character indication position.

Figure 7:
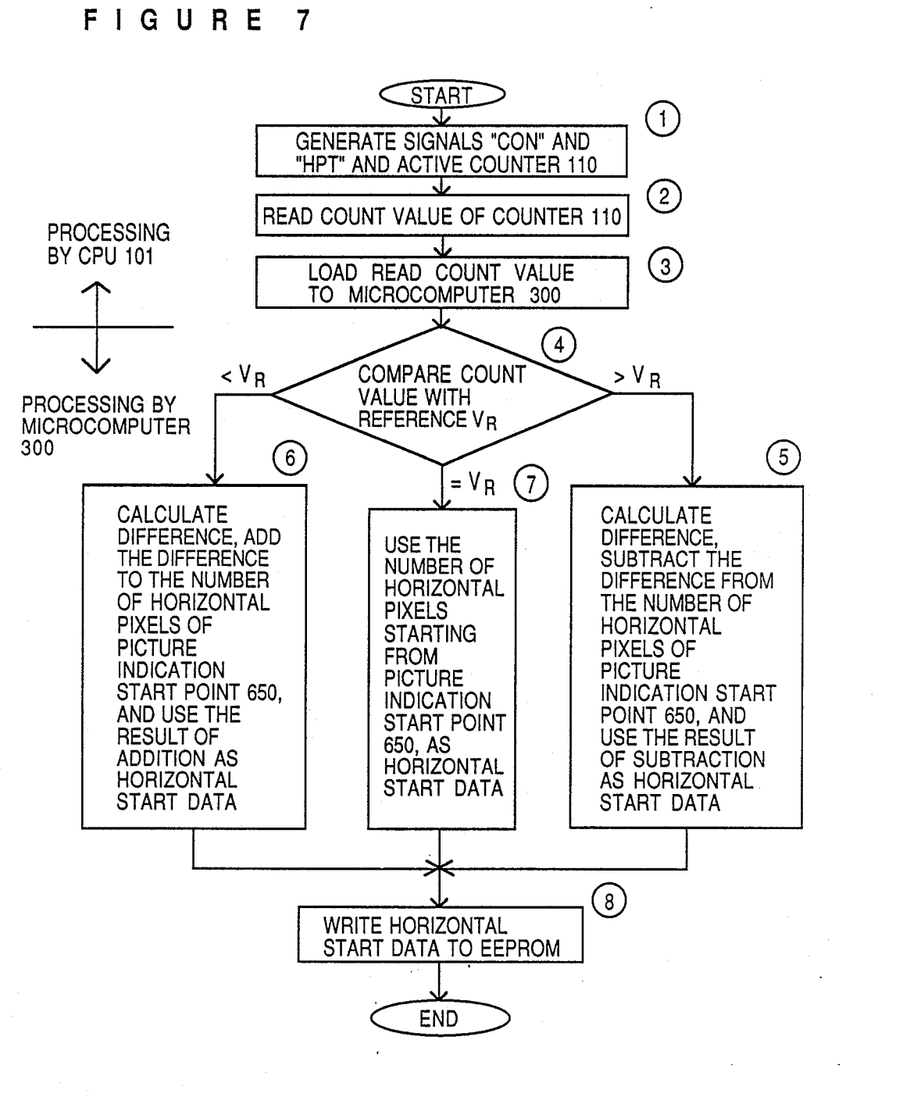
FIGS. 7, 8 and 9 are flow charts illustrating an operation of the system shown in FIG. 5.

The character signal generator 100 is incorporated in the television receiver set together with the television signal processing system (150 to 155), the key input 160 and a non-volatile memory (EEPROM) 170 for storing initialization data, and then is shipped from a maker. However, before the shipment, a microcomputer 300 is coupled to the memory 170 of the television set 200 through a data line 171 so that the initialization data is written to the memory 170. The initialization data includes reference date for controlling the brightness, the contrast and the hue in a digital processing manner. The data line 171 is also connected to the CPU 101 of the character signal generator 100, so that an instruction for measurement of the pulse width of the horizontal synchronism pulse $H_S$ is given when the initialization data is written to the memory 170. In response to the instruction for measurement of the pulse width, the CPU 101 will executes the processing as shown in the flowchart of FIG. 7.

The CPU 101 generates the character on signal CON and a horizontal pulse width test signal HPT. The signal CON is inputted to the synchronism oscillator 103 to activate the oscillator 103. Since an inverted signal $\overline{HPT}$ of the test signal HPT is inputted to the AND gate 104, even if the horizontal synchronism pulse $H_s$ is generated, the oscillator will not stop its oscillation. The synchronism pulse generated by the oscillator 103 and the test signal HPT are inputted to an AND gate 109, which receives the horizontal synchronism pulse $H_s$ at its third input. Therefore, the gate 109 outputs the pulse of the oscillator 103 to a horizontal synchronism pulse width counter 110 only for a period of time corresponding to the pulse width of the horizontal synchronism pulse $H_s$. Thus, the counter 110 counts the pulse of the activated oscillator 103 by the number corresponding to the pulse width of the horizontal synchronism pulse $H_s$ (step 1).

Then, the CPU 101 reads the count value of the counter 110 through the bus 102 (step 2), and loads the read count value to the microcomputer 300 through the data line 171 (step 3).

Thereafter, the microcomputer 300 will execute necessary processings. Firstly, the microcomputer 300 compares a preset reference value with the read count value loaded by the CPU 101 (step 4). The preset reference value is for example 18 corresponding to 4.5 $\mu$sec. On the basis of the result of the comparison, the microcomputer 300 generates a character indication position correction data. In this connection, the character signal generator 100 includes two counters for setting a character indication position in the horizontal direction, namely, a horizontal positioning counter 106 and a horizontal indication position counter 114. The horizontal positioning counter 106 indicates the horizontal position of the picture indication start point 650 in FIG. 6, and the horizontal indication position counter 114 indicates a horizontal indication start position of the character 620 to be indicated. Therefore, even if the content of the counter 114 varies in accordance with the position of the character to be indicated, it is sufficient if only the data to be set in the counter 106 has been corrected. Therefore, the program control becomes easy.

Returning to FIG. 7, if it is judged in the step 4 that the count value is larger than the reference value $V_R$, it goes to a step 5. In the step 5, a difference between the count value and the reference value $V_R$ is calculated, and the difference is subtracted from the number of pixels indicating the picture indication start point 650 in the horizontal direction. The result of the subtraction is used as the horizontal start data. For example, if the pulse width of the horizontal synchronism pulse $H_s$ in the shown receiver set 200 is 6 $\mu$sec, the count value of the counter 110 is 24, and therefore, a calculation of $30-6=24$ is performed. Namely, 24 is used as the horizontal start data. On the other hand, if it is judged that the count value is smaller than the reference value $V_R$, it goes to a step 6. In the step 6, a difference between the count value and the reference value $V_R$ is calculated, and the difference is added to the number of pixels indicating the picture indication start point 650 in the horizontal direction. The result of the addition is used as the horizontal start data. In addition, if it is judged that the count value is equal to the reference value $V_R$, it goes to a step 7. In this case, the number of pixels indicating the picture indication start point 650 is used without modification as the horizontal start data.

In a step 8, the horizontal start data obtained in the step 5, 6 or 7 is written through the data line 171 to the memory 170. In addition, the microcomputer 300 writes the vertical position data of the indication start point 650 (13 in the example shown in FIG. 6) to the memory 170. With this, the setting of the initialization data has been completed in the television receiver set maker, and the microcomputer 300 is decoupled, so that the television receiver set 200 can be shipped.

Figure 8:
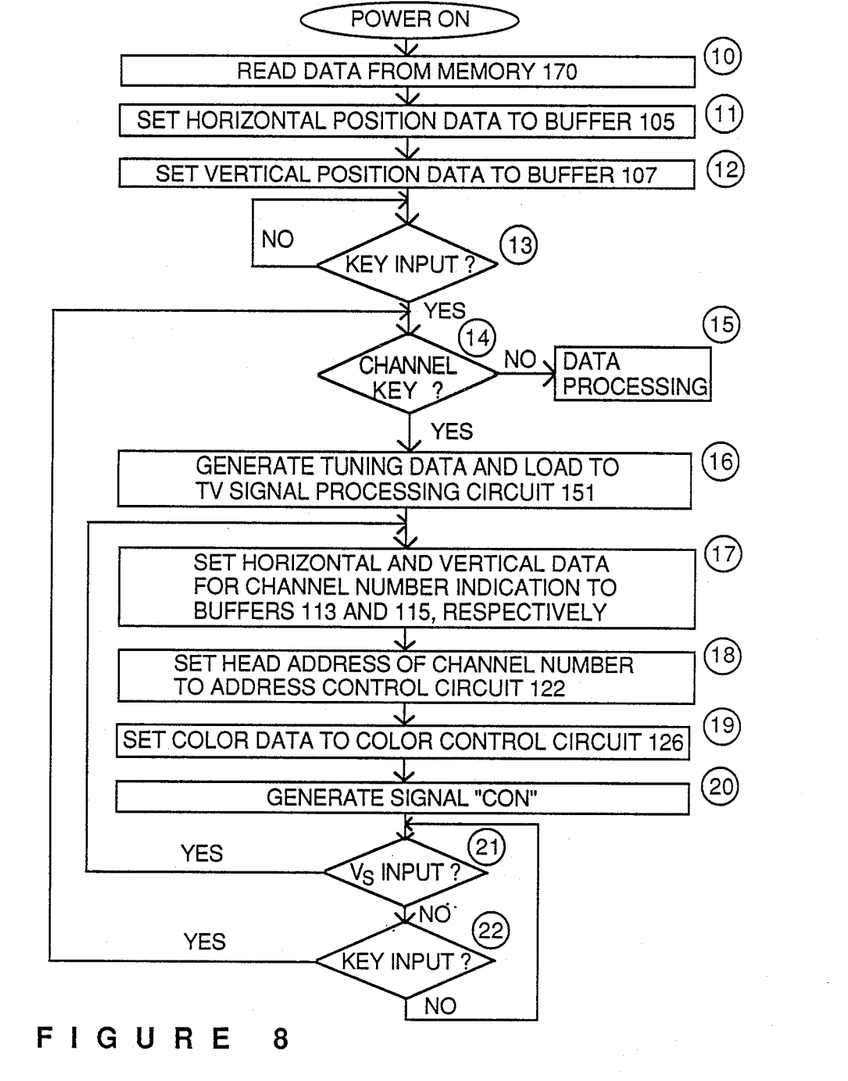

After the shipment, the television receiver set 200 is powered on, the CPU 101 of the will start a processing shown in FIG. 8, in accordance with its internal program. First, the CPU accesses the memory 170 and reads out the horizontal position data "24" and the vertical position data "13" (step 10). The CPU 101 writes the read-out horizontal position data and the read-out vertical position data to storage buffers 105 and 107 through the bus 102, respectively (steps 11 and 12). Since the memory 170 stores the other information concerning the brightness, the contrast, etc., the information will be supplied through the data line 156 to the television signal processing circuit 151. Then, the CPU 101 is in a condition waiting a signal from a key input 160 (step 13).

If a signal is inputted from the key input 160 through the data line 161, the CPU 101 discriminates whether or not the input key signal is a channel key signal (step 14). If not the channel key signal, it goes to a step 15 in which a data processing is performed in accordance with the input key signal. If the channel key signal is inputted, the CPU generates a tuning data for receiving a broadcasting wave indicated by the input key signal, and loads the tuning data to the television signal processing circuit 151 (step 16). As a result, the television signal processing circuit 151 tunes to the selected broadcasting station, and reproduces a television image on the screen of the CRT 155.

Furthermore, the CPU 101 sets horizontal and vertical position data for a position where the selected channel number is to be indicated ("300" and "250" in the example shown in FIG. 6), to storage buffers 113 and 115 through the bus 102, respectively (step 17). Character data which can be displayed on the screen of the CRT 155 is previously stored in a character data memory 123. Therefore, the CPU 101 sets to an address control circuit 122 a head address of a memory area storing a channel number to be indicated (step 18). Further, the address control circuit 122 is also set with data indicative of an end of the indication of characters in one line, for example "FFFF(H)", and data indicative of an end of the indication of characters in one frame, for example "FFFF(H)". Here, (H) represents the hexadecimal notation. In this example, it is assumed that one channel number is indicated in one frame of image. Therefore, if the head address of the channel number to be indicated is "1234(H)", "1234(H)", "FFFF(H)" and "FFFF(H)" are continuously set to the address control circuit 122. If characters are to be indicated at two lines in such a manner that two characters are to be indicated on an upper line and one character is to be indicated on a lower line, "XXXX(H)", "XXXX(H)", "FFFF(H)" "XXXX(H)", "FFFF(H)" and "FFFF(H)" are continuously set to the address control circuit 122. In order to specify a color of the character to be indicated, the CPU 101 sets color data to a color control circuit 126 through the bus 102 (step 19). Thus, the setting of data for the character indication has been completed. As a result, the character on signal "CON" is generated (step 20). Incidentally, the character data memory is composed of a ROM (read only memory) in the shown embodiment, but it can be formed of a RAM (random access memory). In the latter case, the character data is written to the RAM through the data bus 102 as shown by a shadow arrow in FIG. 5.

In response to the signal "CON", a shift register 124 latches data read out from the character data memory 123 in accordance with the address "1234(H)" outputted from the address control circuit 122, namely, 10-bit data of a first scan line of the character (channel number) to be indicated. In addition, the synchronism oscillator 103 starts its oscillation in response to the signal "CON". When television signal processing circuit 151 tunes the selected channel and then generates a vertical synchronism pulse $V_S$, the vertical positioning counter 108 fetches the vertical position data "13" stored in the buffer 107, and the vertical indication position counter 116 fetches the character indication vertical position data "250" stored in the buffer 115. Since the horizontal synchronism pulse $H_S$ is inputted to a clock input of the counter 108, when 13 horizontal synchronism pulse $H_S$ are supplied, the AND gate 112 is opened so that the horizontal synchronism pulse $H_S$ is inputted to the counter 116. When 250 horizontal synchronism pulses $H_S$ are further supplied, an output of the counter 116 is brought into a high level, and the high level signal is inputted to an AND gate 111.

The horizontal positioning counter 106 and the horizontal indication position counter 114 fetch the contents of the buffers 105 and 113, respectively, each time the horizontal synchronism pulse $H_S$, and therefore, the contents of the counters 106 and 114 have been made "24" and "300", respectively, in response to the generation of a 264th horizontal synchronism pulse. When the horizontal synchronism pulse $H_S$ of the 6 $\mu$sec pulse width falls down, the synchronism oscillator 103 generates the horizontal position pulse to the counter 106. When the counter 106 counts 24 horizontal position pulses, the counter 106 generates a high output signal on the basis of comparison between the count value and the content of the buffer 105. As mentioned above, the pulse width of the 6 $\mu$sec pulse width horizontal synchronism pulse is smaller than the horizontal synchronism pulse having a standard pulse width by a length corresponding to six horizontal synchronism pulses outputted from the synchronism oscillator 103. Therefore, the moment the output of the counter 106 is brought into a high level corresponds to the point of 30 pixels from a left edge of the frame 600 shown in FIG. 6. Namely, it is coincident with the picture indication start point 650 in the horizontal direction.

With the high level output of the counter 106, the AND gate 111 is opened, the horizontal synchronism pulse outputted from the synchronism oscillator 103 is inputted to the horizontal indication position counter 114. The counter 114 brings its output to a high level when 300 pulses are counted, so that an AND gate 117 is opened. Namely, the AND gate 117 is opened at the timing corresponding to $(T_1+T_2)$. Therefore, the horizontal synchronism pulse outputted from the synchronism oscillator 103 is supplied through the AND gates 111 and 117 to the shift register 124 as a shift clock. As a result, the shift register 124 shifts its data, bit by bit, in synchronism with the horizontal synchronism pulse outputted from the synchronism oscillator 103. The data shifted out from the shift register 124 is supplied through the opened AND gate 125 to the color control circuit 126. Here, when the output of the shift register 124 is at a high level, the blanking signal BL is also at a high level. With the high level blanking signal BL, the blanking control circuit 152 supplies a low level output to the addition circuit 153, regardless of the color signals $V_R$, $V_G$ and $V_B$. On the other hand, the color control circuit 126 responds to the high level input to generate character color signals $C_R$, $C_G$ and $C_B$ to the addition circuit 153. Thus, the color character signals are superimposed with the image color signals and then supplied to the CRT 155.

When ten shift pulses (the pulse generated by the oscillator 103) are inputted, namely, when the date for the first line of the character to be indicated has been outputted, the 1-character counter 119 preset with the value "10" generates a 1-character indication end signal "CE". In response to this signal "CE", the address control circuit 122 increments the address data "1234(H)" by 1, namely to "1235(H)". At the same time, the address control circuit 122 designates a next address data. In this example, since the address data is "FFFF(H)", the indication inhibit signal "DI" is brought into an active level (low level), so that the AND gate 125 is closed.

In response to the 265th horizontal synchronism pulse $H_S$, the counter 106 and 114 fetch the data from the buffers 105 and 113, respectively. In addition, address control circuit 122 designates the address data "1235(H)" and accesses the memory 123. As a result, the 10-bit data of a second line of the character to be indicated is read out from the memory 123. The address control circuit 122 generates a character set signal "CS" to the shift register 123, so that the newly 10-bit data of the second line is set to the shift register 123. Therefore, the AND gate 117 is opened at the timing corresponding to $(T_1+T_2)$, the shift clock (the output of the oscillator (103) is supplied to the shift register 124, so that the second line of the character is indicated on the CRT 155.

Thereafter, in response to the signal "CE", the address data is incremented from "1235(H)" to "1236(H)", and the AND gate 125 is closed in response to the signal "DI".

Thus, the character indicative of the channel number is indicated at the position 620 in FIG. 6.

On the other hand, the AND gate 118 is maintained in an open condition, and therefore, the 1-line counter 120 counts the horizontal synchronism pulse $H_S$. When 16 horizontal synchronism pulses $H_S$ are counted, the counter 120 generates a signal "RE" indicative of an end of indication of characters in one line. In response to the signal "RE", the address control circuit 122 designates an address data for characters to be indicated on a next one line. In this example, the address data for characters to be indicated on a next one line is "FFFF(H)". Accordingly, the indication inhibit signal is maintained at a low level, and therefore, the character indication has been completed for one frame of picture.

When the television signal processing circuit 151 generates the vertical synchronism signal $V_s$, the processing is jumped to the step 17 from a step 21 as shown in FIG. 8, so that a sequence of steps 17 to 20 are executed during a vertical blanking period. If the key input is generated, the processing is jumped from a step 22 to the step 14.

Figure 9:
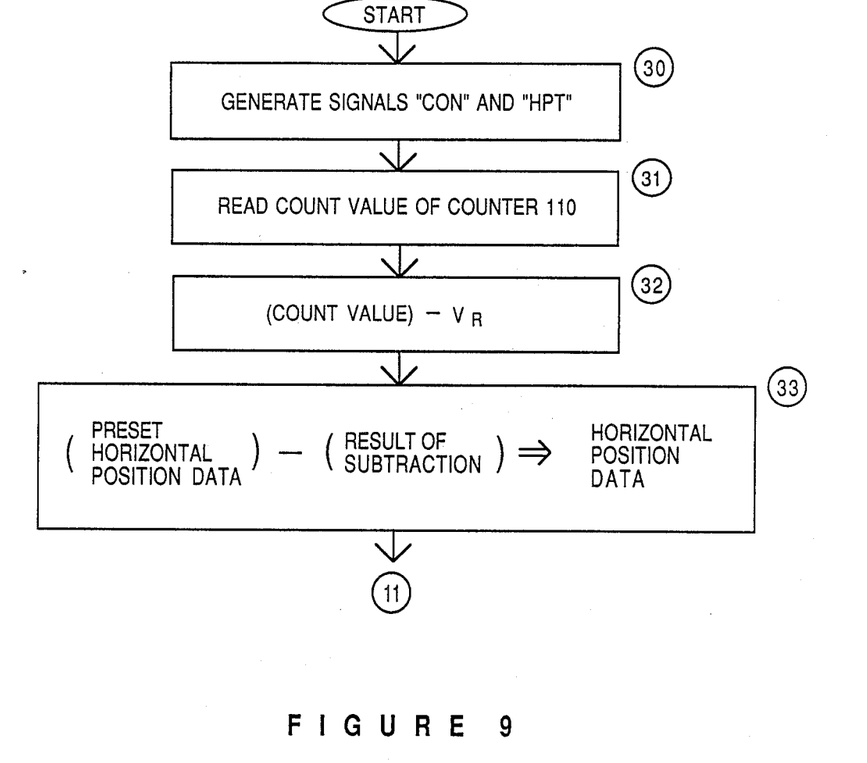

In the above mentioned embodiment, in the process for writing the initialization data to the memory 170 at the maker side, the correction data has been prepared on the basis of the pulse width of the horizontal synchronism pulse $H_s$, and then written to the memory 170. However, since the character signal generator 100 has the microcomputer function, the character signal generator 100 itself can correct the horizontal position data. One example of the operation is shown in the flowchart of FIG. 9. First, the signals "CON" and "HPT" are generated and the pulse width of the horizontal synchronism pulse $H_s$ is measured in a step 30. The count value of the counter 110 is read out in a step 31, and the reference value is subtracted from the read-out count value in a step 32. The result of the subtraction is subtracted from the preset horizontal data in a step 33, and the result is used as the horizontal position data. Thereafter, the processing goes to the step 11 shown in FIG. 8.

As explained above, the picture signal generator in accordance with the present invention measures the pulse width of the horizontal synchronism pulse and generates a corrected horizontal indication start position data on the basis of the result of the measurement. Therefore, a character to be superimposed is properly positioned in the horizontal direction.

The invention has thus been shown and described with reference to the specific embodiments. However, it should be noted that the present invention is in no way limited to the details of the illustrated structures but changes and modifications may be made within the scope of the appended claims.

We claim:

1. An apparatus for use in for a system indicating at least first and second pictures in a screen of a horizontal scan type display, comprising a first circuit for measuring the pulse width of a horizontal synchronism signal for the first picture, and a second circuit for determining a horizontal indication start position of the second picture on the basis of the measured pulse width of a horizontal synchronism signal.

2. An apparatus for use in for a system indicating at least first and second pictures in a screen of a horizontal scan type display, comprising a horizontal position signal generator receiving a horizontal synchronism signal for generating a horizontal position pulse signal in synchronism with a trailing edge of said horizontal synchronism signal but at a repetition frequency sufficiently higher than that of the horizontal synchronism signal, a horizontal indication start position counter coupled to receive said horizontal position pulse signal, a horizontal synchronism signal width measuring counter coupled to receive and count a measurement clock when said horizontal synchronism signal is at a predetermined level, a horizontal indication start position controller coupled to receive an output of the horizontal synchronism signal width measuring counter and a horizontal synchronism signal reference width data for generate a horizontal indication start position data, a horizontal indication start position data latch coupled to receive and latch said horizontal indication start position data, and a coincidence detection circuit coupled to receive an output count of said horizontal indication start position counter and the output of said horizontal indication start position data latch for generating a horizontal indication start position signal when said count value of said indication start position counter becomes coincident with the value of said horizontal indication start position data.

3. An apparatus claimed in claim 2 wherein said horizontal synchronism signal width measuring counter is coupled to a gate circuit which receives said measurement clock and is controlled by said horizontal synchronism signal so that said gate circuit is opened when said horizontal synchronism signal is at said predetermined level.

4. A television receiver comprising a television signal processing circuit receiving and processing a television signal for displaying a television image, and a character signal generator for superimposing a character on the television image, said character signal generator including comprising a first circuit for measuring the pulse width of a horizontal synchronism pulse for said television image, and a second circuit for determining a horizontal indication start position of a character to be superimposed, on the basis of the measured pulse width of said horizontal synchronism pulse.

* * * * *